(12) United States Patent
Rich

(10) Patent No.: US 8,233,189 B2
(45) Date of Patent: *Jul. 31, 2012

(54) SYSTEM AND METHOD FOR DISSEMINATING COLOR INK AND COLORANT FORMULAS

(75) Inventor: Danny C. Rich, Hamilton Township, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/042,088

(22) Filed: Mar. 4, 2008

(65) Prior Publication Data

US 2008/0192273 A1 Aug. 14, 2008

Related U.S. Application Data

(63) Continuation of application No. 10/709,659, filed on May 20, 2004, now Pat. No. 7,417,764, which is a continuation-in-part of application No. 09/931,678, filed on Aug. 16, 2001, now Pat. No. 7,034,960.

(51) Int. Cl.
*H04N 1/46* (2006.01)
*H04N 1/50* (2006.01)
*G06K 9/00* (2006.01)

(52) U.S. Cl. ........ 358/1.9; 358/501; 358/1.15; 382/162; 382/167

(58) Field of Classification Search .................. 358/1.9, 358/501, 1.15; 382/162, 167
See application file for complete search history.

(56) References Cited

U.S. PATENT DOCUMENTS

| | | | |
|---|---|---|---|
| 4,649,502 A | 3/1987 | Keller et al. | |
| 4,813,000 A | 3/1989 | Wyman et al. | |
| 4,843,574 A | 6/1989 | Gerber | |
| 5,141,323 A | 8/1992 | Kipphan et al. | |
| 5,182,721 A | 1/1993 | Kipphan et al. | |
| 5,195,043 A | 3/1993 | Varner | |
| 5,400,138 A | 3/1995 | Peterson et al. | |
| 5,406,475 A | 4/1995 | Kouchi et al. | |
| 5,450,314 A | 9/1995 | Kagami et al. | |
| 5,555,505 A | 9/1996 | Oosawa et al. | |

(Continued)

FOREIGN PATENT DOCUMENTS

DE 3707027 9/1986

(Continued)

OTHER PUBLICATIONS

Crim Elias, Controlling Digital Color, American Printer, Nov. 1997, pp. 26, 28 and 30.

(Continued)

*Primary Examiner* — Charlotte M Baker
(74) *Attorney, Agent, or Firm* — McKenna Long & Aldridge LLP

(57) ABSTRACT

The present invention provides a plurality of representations of color that are stored in an electronic color library and that can be selected by a user. After a color selection is made, a plurality of color ink formulas and/or colorant formulas capable of producing the selected color are provided. Further, other selections can be made to define a substrate or other criteria that can impact the color ink formulas. The user can make a selection among the plurality of color ink formulas and/or colorant formulas. The selected color ink formula(s) (or colorant formula(s)) can be transmitted over a communication network, such as the Internet or a local Intranet to another party, such as an ink manufacturer.

69 Claims, 8 Drawing Sheets

U.S. PATENT DOCUMENTS

| | | | |
|---|---|---|---|
| 5,668,633 A | 9/1997 | Cheetam et al. | |
| 5,680,327 A | 10/1997 | Cook et al. | |
| 5,720,017 A | 2/1998 | Cheetam et al. | |
| 5,774,230 A | 6/1998 | Goto | |
| 5,841,121 A | 11/1998 | Cheetam et al. | |
| 5,877,966 A | 3/1999 | Morris et al. | |
| 5,889,932 A | 3/1999 | Adegeest et al. | |
| 6,015,809 A | 1/2000 | Zhu et al. | |
| 6,040,902 A | 3/2000 | Jung et al. | |
| 6,043,894 A | 3/2000 | Van Aken et al. | |
| 6,108,095 A | 8/2000 | Graf | |
| 6,192,147 B1 | 2/2001 | Bucher et al. | |
| 6,226,103 B1 | 5/2001 | Klassen et al. | |
| 6,233,496 B1 | 5/2001 | Ippitsu | |
| 6,342,952 B1 * | 1/2002 | Chan | 358/1.9 |
| 7,034,960 B2 | 4/2006 | Stone et al. | |
| 7,053,910 B2 | 5/2006 | Newman | |
| 7,068,391 B2 | 6/2006 | Dewitte et al. | |
| 7,202,976 B2 | 4/2007 | Stone et al. | |
| 7,268,918 B2 | 9/2007 | Postle et al. | |
| 7,417,764 B2 | 8/2008 | Rich | |
| 2003/0035126 A1 | 2/2003 | Stone et al. | |
| 2003/0184772 A1 | 10/2003 | Agarwal | |
| 2003/0210395 A1 | 11/2003 | Takahashi et al. | |
| 2004/0073526 A1 | 4/2004 | McClanahan | |
| 2007/0263249 A1 | 11/2007 | Rich et al. | |

FOREIGN PATENT DOCUMENTS

| | | |
|---|---|---|
| DE | 3714179 | 9/1988 |
| DE | 4229267 | 3/1994 |
| DE | 4237004 | 5/1994 |
| DE | 19637234 | 3/1998 |
| EP | 0448215 A1 | 9/1991 |
| EP | 0767362 | 4/1997 |
| EP | 0825506 | 2/1998 |
| EP | 089300 A1 | 8/1998 |
| EP | 0859300 | 8/1998 |
| GB | 2071473 | 9/1981 |
| GB | 2107047 | 4/1983 |
| GB | 2289018 | 11/1995 |
| JP | 10-324829 | 12/1998 |
| JP | 11-066119 | 3/1999 |
| JP | 11-286635 | 10/1999 |
| JP | 2001-063007 | 3/2001 |
| JP | 2001-084288 | 3/2001 |
| JP | 2003-333355 | 11/2003 |
| WO | WO 97/34409 | 9/1997 |
| WO | WO 03/017144 A2 | 2/2003 |
| WO | WO03017144 A2 | 2/2003 |
| WO | WO03083735 A2 | 10/2003 |
| WO | WO2008124078 A1 | 10/2008 |

OTHER PUBLICATIONS

Stoy, John, Palette Control Made Easy, Electronic Publishing, May 1997, pp. 46-47.

Lovig-Neale, Deb., Digital Color Fidelity in the 1990's: Attacking Color Shifts, Electronic Publishing, Aug. 1994, pp. 14-16 and 18.

Matching System Ensures Accuracy, Printing Impressions, Oct. 1990, pp. 36H-36K.

Bonham, JS., Flowers, A.G., Johnson, L.B., On Line Color Control for Mechanical Papers, Pulp & Paper Canada, Apr. 1990, pp. 43-46.

Kaverman, John, Color Matching for Pad Printing, Screen Print, Dec. 1999 pp. 38-40, 44 and 46.

Briggs, John, Forrest David J., Tse, Ming-Kai, Reliability Issues for Color Measurement in Quality Control Applications, NIP 14: International Conference on Digital Printing Technologies, Toronto, CA, Oct. 1998, pp. 595-602.

Prolink Color Guard Color-Matching Software, Screen Printing, Nov. 1995, pp. 132.

1995 Tappi Conference-Dyes, Fillers & Pigments Short Courses, Chicago, IL, Apr. 26-28, 1995, pp. 401-418.

Sule, A.D., Recent Developments in Colour Measurement and Colour Management, Indian Journal of Fibre & Textile Research, vol. 21, Mar. 1996, pp. 64-68.

Holland, Caryl, Color Impact & Control, American Ink Maker, Sep. 2000, pp. 14-17.

Rosen Mitchel, Fairchild, Mark D., Johnson, Garret M., Wyble, David R., Color Management Within a Spectral Image Visualization Tool, Munsell Color Science Laboratory, Rochester Institute of Technology, Rochester, NY.

Mijdam Edward, Computer-Controlled Color Matching of Flexographic Inks in a Production Printing Environment, American Ink Maker, Aug. 2001, pp. 44-49.

Tolliber-Nigro Heidi, The Packaging Workflow: What's Really Going on There? American Ink Maker, Jun. 2001, pp. 30, 32, 36, 37, 59 and 60.

Taskar Milind; Kannan R., Colour Maker—An Infinite Shade Card and the Colour Trend Setter of Shades in the Industry, Pigment and Resin Technology, vol. 27, pp. 9-11.

Datacolor Press Release, Lawrenceville, NJ, Jul. 11, PRNewsire.

Stollnitz E J et al: "Reproducing Color Images Using Custom Inks", Computer Graphics. SIGGRAPH 98 Conference Proceedings. Orlando, FL, Jul. 19-24, 1998; [Computer Graphics Proceedings. SIGGRAPH], ACM, New York, NY, US, Jul. 19, 1998, pp. 267-274, XP002531570, DOI: DOI:10.1145/280814.280889 ISBN: 978-0-89791-999-9.

* cited by examiner

SYSTEM AND METHOD FOR DISSEMINATING COLOR INK AND COLORANT FORMULAS

CROSS REFERENCE TO RELATED APPLICATIONS

This application is a continuation of U.S. application Ser. No. 10/709,659, filed May 20, 2004 now U.S. Pat. No. 7,417,764 which is a Continuation-in-part of U.S. application Ser. No. 09/931,678, filed Aug. 16, 2001, now U.S. Pat. No. 7,034,960 entitled System and Method for Managing Electronic Transmission of Color Data, the content of both of which are hereby incorporated by reference in their entirety.

BACKGROUND OF THE INVENTION

The present invention relates to a system and method for electronically communicating, coordinating and disseminating formula data for the production of color ink between a plurality of parties.

Electronic color production hardware and software systems currently exist which separately and independently perform tasks associated with production of color-related products. For example, a known system reads a visible spectrum of a color sample and generates data regarding measured amounts of light absorbed or reflected at particular points in the spectrum. Any given color has a spectral curve associated with it that functions as a signature of the color. Once a spectral curve is determined, the visible spectrum and coefficients are then processed to predict a color formula for reproducing the color. The color formula can then be analyzed to create a color ink formula for creating a color.

Other common color representations exist, for example RGB represents the degree of red, green and blue in a color. CMYK represents the degree of cyan, magenta, yellow and black in a given color. Accurate translation between color representations, for example a translation from RGB to CMYK for computer monitors and computer printers is provided. Accurate color reproduction is achieved, in part, by retrieving data for a plurality of input and output devices, e.g., printers, monitors, and color measuring devices, and modifying the color translation formulas to account for the specific devices receiving the data. Computer software design packages, such as ADOBE ILLUSTRATOR and PAGEMAKER, provide such conversion functionality. Another known system provides a method and apparatus for accurately matching colors. For example, spectral data are received from a color measuring device and the corresponding color is matched in an electronic color library. The desired color is compared to colors stored in the electronic color library and the color or colors in the library that are within a specified color range are reported. By searching in an electronic library, the traditional standard color swatch book used for locating a desired color is replaced. This electronic color library is vulnerable, however, to problems associated with reproducing samples from multiple devices.

Another method involves receiving a communication of the designer's computer image and converting the RGB setting to CIELAB values. Computer software design packages such as ADOBE PHOTOSHOP provide such conversion functionality.

Currently, methods exist for defining color ink formulas for making ink suitable for creating a particular color. However, no suitable system is available which enables, for example, a designer of color-related products to identify a color and a particular substrate, and to automatically generate a color ink formula suitable for creating the color on the substrate, which can be transmitted automatically to another party, for example an ink manufacturer.

SUMMARY OF THE INVENTION

The foregoing illustrates the need for a system that enables electronic communication, coordination and dissemination of color ink formulas between the parties associated with creating color-related products.

The present invention provides for a system and method for electronically selecting at least one color ink formula that is suitable to produce a color based on at least one of a plurality of criteria. In one embodiment, a plurality of colors and criteria are electronically provided. Further, a plurality of color ink formulas that are capable of defining an ink suitable for creating a single color based on other criteria are electronically provided. A user preferable makes an electronic selection from the plurality of colors, and also makes an electronic selection of at least one criteria from the plurality of criteria. The present invention electronically matches the selected color and the selected criteria thereby allowing for the electronic selection of the suitable color ink formula. Preferably, the selected color ink formula is electronically transmitted to a receiving party, such as in ink manufacturer.

Moreover, the present invention provides for electronic color information representing colors to be stored in an electronic color library. After a color selection is made, a plurality of color ink formulas being capable of defining an ink suitable for creating the selected color are provided. Further, other selections can be made in order to define a substrate or other criteria that may impact the formula for the color ink to create a color. Further, the user can make a selection among the plurality of color ink formulas. The selected color ink formula (or plurality of color ink formulas) can be transmitted over a communication network, such as the Internet or a local Intranet to another party, such as an ink manufacturer.

BRIEF DESCRIPTION OF DRAWINGS

For the purpose of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which.

DETAILED DESCRIPTION OF THE INVENTION

Figure 1:
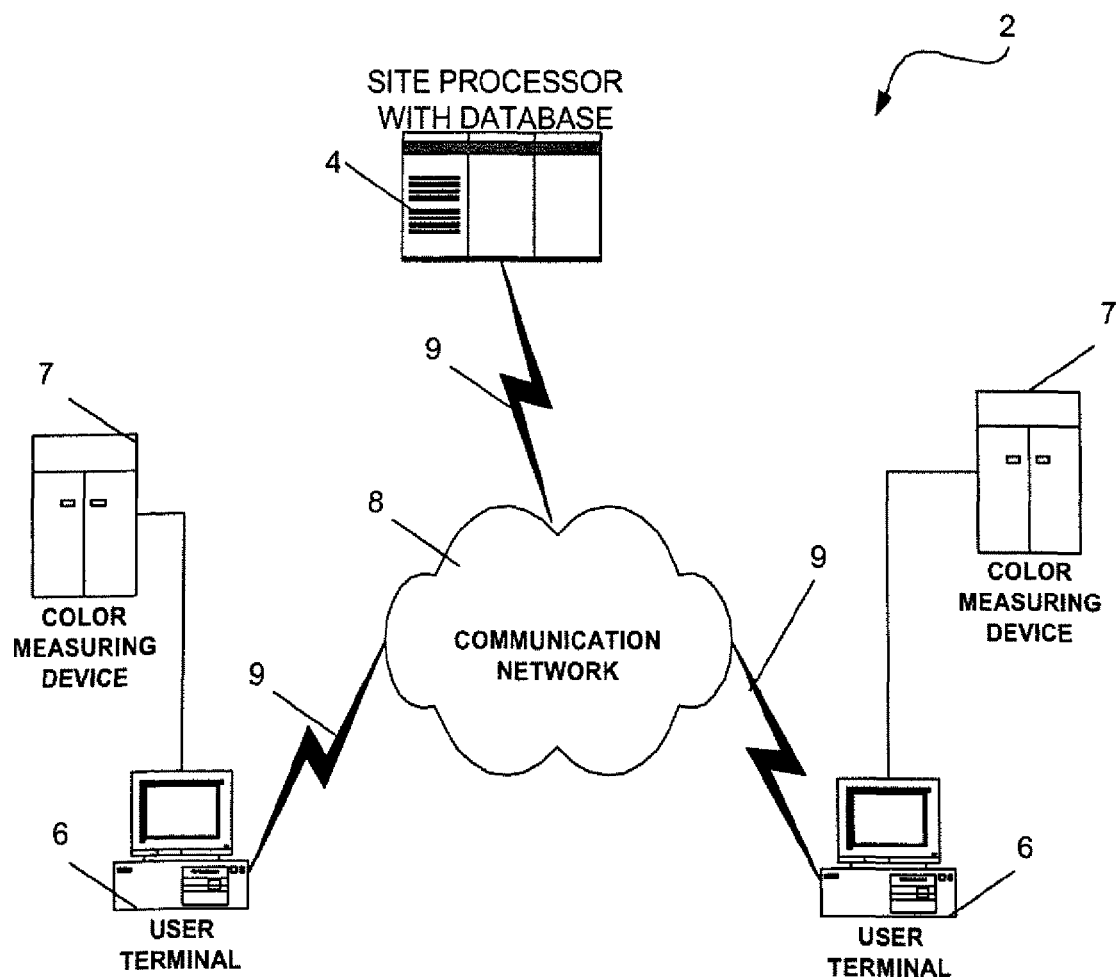
FIG. 1 is a diagram of an example hardware arrangement for color ink dissemination system constructed in accordance with the principles of the present invention.

As used herein, the term "website" refers to a related set of files which are maintained in one or more "web servers" and which, when transmitted to a user terminal, cause the user terminal to display and/or execute programmatic operations corresponding to the data contained in the files. Typically, the files comprising the website are prepared using one or more of a combination of Hyptertext Mark-Up Language (HTML), Extendable Mark-Up Language (XML), Java Applets, ActiveX programs, Standard Generalized Mark-Up Language (SGML) files and the like. Website files are typically transmitted to the user terminal using one or more protocol(s) such as the Hypertext Transfer Protocol (HTTP) under the Transmission Control Protocol/Internet Protocol (TCP/IP) suite of communication protocols.

Also as used herein, the term "browser" refers to an application program residing and executing on the user terminal which functions as an HTTP client, sending requests to web servers for website files. The request is typically sent in the form of a Uniform Resource Locator (URL) or by selecting a hypertext link presented on the user terminal display. The browser functions to receive a file and/or data from the web server and format the received files and/or data substantially in the manner described herein, displaying the same on the user terminal. Examples of browser programs include MICROSOFT INTERNET EXPLORER and NETSCAPE COMMUNICATOR.

Also as used herein, the term "visibly perceptible representation" refers to a perception of color as received by the human eye or other detecting device regardless of the medium for providing the representation, i.e. computer monitor, paper, printing press, etc.

As used herein, the term "link" refers to a selectable connection from one or more word(s), picture(s) or other information object(s) to others in which the selectable connection is presented within the web browser. The information object can include sound and/or motion video. Selection is typically made by "clicking" on the link using an input device such as a mouse, track ball and the like. Of course, one of ordinary skill in the art will appreciate that any method by which an object presented on the screen can be selected is sufficient.

Also, as used herein, the term "suitable" refers, generally, to something that is appropriate in quality, for example, as agreed upon among parties to a business transaction. In accordance with the present invention, a color may be suitable as a match to a target color, even though the target color is not identical. Moreover, ink may be suitable to produce a color, even though the color provided by the ink is not identical to a target color.

As used herein, the term "match" or "matching" refers, generally, to an act that identifies a corresponding part that involves, solely or with aid of a computing device, with little or no human involvement or interaction. As used herein, matching, typically refers to producing color ink and/or colorant formulae.

Referring now to the drawing figures in which like reference numerals refer to like elements, there is shown in FIG. 1 a diagram of an example color ink formula dissemination system constructed in accordance with the principles of the present invention and designated generally as "Color Ink Formula Dissemination System 2". System 2 is preferably comprised of one or more site processor(s) 4 coupled to one or more user terminal(s) 6 across communication network 8.

Site processor 4 preferably includes all databases necessary to support the present invention. However, it is contemplated that site processor 4 can access any required databases via communication network 8 or any other communication network to which site processor 4 may be coupled. If separate, site processor 4 can communicate with the database using any known communication method including a direct serial or parallel interface, or via a local or wide area network.

User terminals 6 communicate with site processors 4 using data connections 9, which are respectively coupled to communication network 8. Communication network 8 can be any communication network, but is typically the Internet or some other global computer network. Data connections 9 can be any known arrangement for accessing communication network 8 such as dial-up serial line interface protocol/point-to-point protocol (SLIP/PPP), integrated services digital network (ISDN), dedicated leased-line service, broadband (cable) access, frame relay, digital subscriber line (DSL), asynchronous transfer mode (ATM) or other access techniques. User terminals 6 have the ability to send and receive data across communication network 8, and are equipped with web browsers to display the received data on display devices incorporated therewith.

By way of example, user terminals 6 may be personal computers such as Intel Pentium-class computers or Apple Macintosh computers, but are not limited to such computers. Other terminals which can communicate over a global computer network such as palmtop computers, personal digital assistants (PDAs) and mass-marketed Internet access devices such as WebTV can be used. User terminals 6, further, take into account associated hardware, for example printers, monitors, scanners and the like.

Also as used herein and for purposes of convenience, the term "workstation" refers to a user terminal 6, and, as appropriate in context, further refers to a person operating user terminal 6. Also as used herein, the terms "workstation characteristics" and "user terminal characteristics" refer to the functional elements of each workstation, including, but not limited to, central processing units, ROM, RAM, display devices, printing devices, network interfaces, disk drives, floppy disk drives, tape drives, CD-ROM or DVD drives, databases and application code and one or more input device(s), for example keyboard, mouse, track ball and the like.

In addition, the hardware arrangement of the present invention is not limited to devices that are physically wired to communication network 8. It is contemplated that wireless devices using a wireless application protocol (WAP) can inter-operate with site processors 4 using wireless data communication connections.

According to the present invention, user terminal 6 provides user access to site processors 4 for the purpose of receiving and providing color-related product data. The specific functionality provided by System 2, and in particular site processors 4, is described in detail below.

System 2 employs software that provides color-related functionality. For example, a plurality of information types are stored and are retrievable in software that preferably resides on one or more site processors 4. Examples of information types include electronic color information, color ink formulas, and resistance.

One of the functions capable of being performed by site processor 4 is that of operating as a web server and a website host. Site processors 4 typically communicate with communication network 8 across a permanent i.e. unswitched, data connection. Permanent connectivity ensures that access to site processors 4 is always available.

Figure 2:
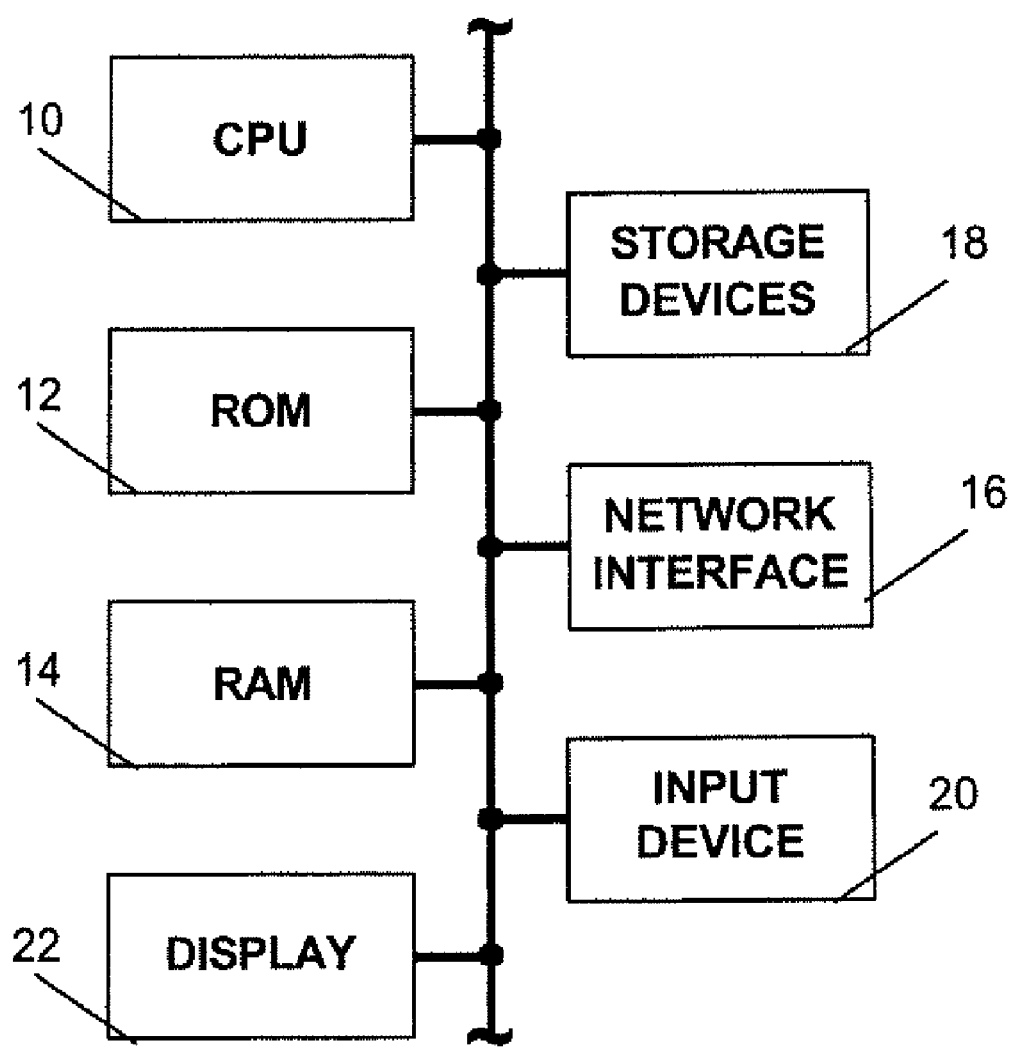
FIG. 2 is a block diagram of the functional elements of site processors and user terminals.

As shown in FIG. 2, the functional elements of each site processor 4 preferably include one or more central processing unit(s) (CPU) 10 used to execute software code in order to control the operation of site processor 4, read only memory (ROM) 12, random access memory (RAM) 14, one or more network interface(s) 16 to transmit and receive data to and from other computing devices across a communication network, storage devices 18 such as a hard disk drive, floppy disk drive, tape drive, CD-ROM or DVD drive for storing program code, databases and application code, one or more input device(s) 20 such as a keyboard, mouse, track ball and the like, and a display 22.

The various components of site processor 4 need not be physically contained within the same chassis or even located in a single location. For example, as explained above with respect to databases which can reside on storage device 18, storage device 18 may be located at a site which is remote from the remaining elements of site processors 4, and may even be connected to CPU 10 across communication network 8 via network interface 18.

The functional elements shown in FIG. 2 (designated by reference numbers 10-22) are preferably the same categories of functional elements preferably present in user terminal 6. However, not all elements need be present, for example, storage devices in the case of PDAs. Further, the capacities of the various elements are arranged to accommodate the expected user demand. For example, CPU 10 in user terminal 6 may be of a smaller capacity than CPU 10 as present in site processor 4. Similarly, it is likely that site processor 4 will include storage devices 18 of a much higher capacity than storage devices 18 present in user terminal 6. Of course, one of ordinary skill in the art will understand that the capacities of the functional elements can be adjusted as needed.

The nature of the present invention is such that one skilled in the art of writing computer executed code (software) can implement the described functions using one or more of a combination of a popular computer programming language including but not limited to: C++, Visual Basic, Java, ActiveX, XML, HTML, and other web application development environments, for example ALLAIRE'S COLD FUSION® and MICROSOFT'S FRONT PAGE®.

As used herein, references to displaying data on user terminal 6 relate to the process of communicating data to the user terminal across communication network 8 and processing the data such that the data can be viewed on the terminal's display 22 using a web browser or the like. The display screens on terminals 6 present areas within System 2 such that a user can proceed from area to area within System 2 by selecting a desired link. Therefore, each user's experience with System 2 will be based on the order with which they progress through the display screens. In other words, because the system is not completely hierarchical in its arrangement of display screens, users can proceed from area to area without the need to "backtrack" through a series of display screens. For that reason, unless stated otherwise, the following discussion is not intended to represent any sequential operation steps, but rather the discussion of the components of System 2.

Although the present invention is described by way of example herein in terms of a web-based system using web browsers and a website server (site processor 4), System 2 is not limited to that particular configuration. It is contemplated that System 2 can be arranged such that user terminal 6 can communicate with, and further send, receive and display data to and from site processor 4 using any known communication and display method, for example, using a non-Internet viewer coupled with a local area network protocol such as the Internetwork Packet Exchange (IPX). Any suitable operating system can be used on user terminal 6, for example, WINDOWS 3.x, WINDOWS 95, WINDOWS 98, WINDOWS CE, WINDOWS NT, WINDOWS XP, LINUX, and any suitable PDA or PALM computer operating system.

In a preferred embodiment, System 2 provides a comprehensive, yet easy to use, website that enables users to transmit or receive data relating to development of one or more color ink formulas for creating an ink suitable for creating the selected color. Color product specialists, including customers, designers, separators, printers, converters and the like preferably interact with each other, and with System 2 itself, via one or more hardware and/or software user interface(s). The user interfaces comprise display screen controls such as text input areas, drop down lists, buttons and screen menus providing users with tools for adding, viewing, and editing data.

In a preferred embodiment, user terminal 6 receives data from a color measuring device 7, for example, a spectrocolorimeter. A data stream is transmitted which may be initially formatted in a variety of device-related ("native") configurations. For example, sequences of data values originating from some measuring devices 7 correspond to an interval in which spectral reflectance curves are read. One particular color measuring device 7 may have a spectral reflectance curve data reading interval of 20 nm which produces a data sequence comprising patterns of 16 numbers. A different color measuring device may have an interval of 10 nm resulting in data formatted in sequences of 31 numbers. The data are preferably received, formatted to a common standard, and processed notwithstanding their device-dependent qualities.

Continuing with the above example, user terminal 6 validates the received data, translates the data into distinct representations, performs data calculations (e.g. averaging and interpolating color data), and further transmits data to other hardware and software applications in a plurality of formats. Data are preferably transmitted directly to the receiving devices. Alternatively, the formatted data are transmitted to site processor 4 and thereafter forwarded to the respective receiving hardware and software applications.

In another embodiment, user terminal 6 interfaces with a color measuring device 7 and receives spectral data, but does not perform any data processing functions. User terminal 6 transmits the spectral data to site processor 4 at substantially the same time when the data are being received from the measuring device 7. Programmed data formatting routines operate within site processor 4 and the data are further transmitted to hardware and software applications.

In yet another embodiment, a color measuring device 7 is not used during development of a colored product. Instead, a color sample is created or retrieved on a user terminal 6 with software provided by system. For example, a designer operating user terminal 6 creates a sample of color. The sample is transmitted to System 2 and development of the color product continues. In this embodiment, no color measuring device 7, other than the user terminal 6, is utilized by the respective parties.

The formula for ink may be determined by manual mixing of colorants selected by a master shader followed by visual or instrumental confirmation of the color. The formula for an ink may also be determined using a computer assisted color matching ("CCM") software application, also known as a computer color formulation program or a computer recipe prediction program. The ink formula is derived either by initial trial of possible combinations of colorants, for example, taken 1, 2 and 3 at a time (combinatorial algorithm), or by retrieving a close but not acceptable color from a palette library and then modifying the formula in order to provide an acceptable color.

Figure 3:
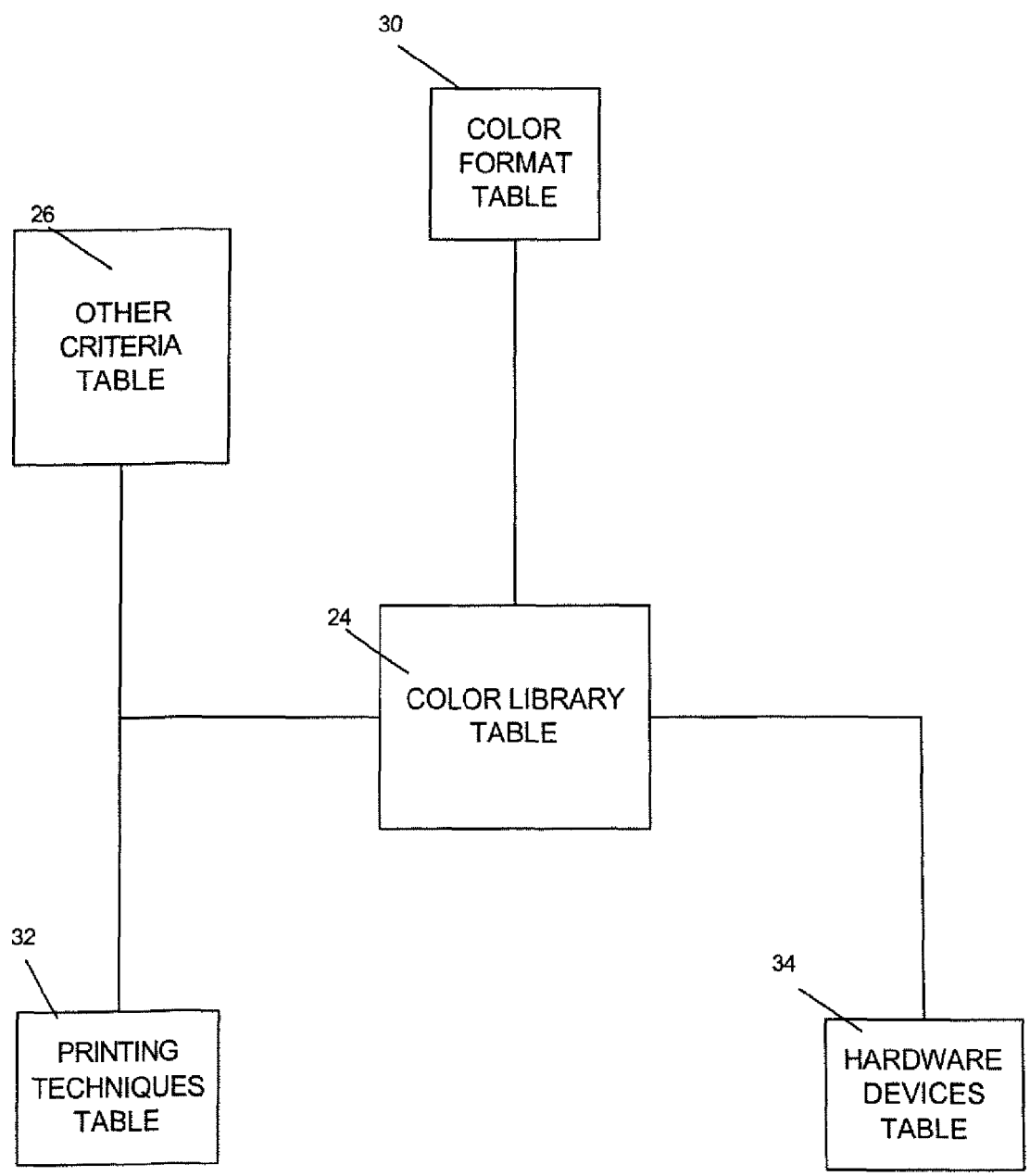
FIG. 3 illustrates the relationships between database tables used in an embodiment of the present invention.

FIG. 3 illustrates the interaction of database tables in a preferred embodiment of the present invention. The tables are used by System 2 to store and manipulate data regarding development of color ink formulas. Users of System 2 are preferably given access to the database tables and to the data therein. In a preferred embodiment, users are supplied with a pointer to the specific database table and/or data therein rather than receiving the complete database tables or data at the user terminal 6.

As shown in FIG. 3, color library table 24 preferably contains records regarding colors. For example, spectral data regarding a specific color are stored in color library table 24. Other types of information stored in color library table are color ink formulas that can recreate colors. In addition to spectral data and color ink formulas, a plurality of names of colors are associated with the spectral data and color ink formulas in color library table 24. Other criteria table 26 stores data regarding elements that can impact a color. For example, data relating to specific substrates are stored in other criteria table 26. Other criteria table 26 also contains, for example, data regarding a color's ability to resist a plurality of elements, such as water, solvent, acid, alkali, temperature, humidity, abrasion, crocking, bending, light and ultraviolet radiation. An additional example of selection criteria includes freeze-thaw cycles and lamination bond strength. Moreover, these criteria may be in the form of an ISO standard performance indices, such as ISO 105/A05 Gray Scale index of color change. There are also ISO indices of staining, solvent resistance and the like, all with numeric scales.

Color format table 30 preferably contains data regarding the plurality of color representations (e.g. RGB, CMYK and CIE XYZ) used by the various devices with System 2. Printing techniques table 32 contains data regarding a plurality of printing methods, for example offset printing and gravure printing. Different printing methods may impact the formulas for creating color ink suitable for creating a particular color. Hardware devices table 34 contains data regarding a plurality of hardware devices involved in color product development, for example monitors, printers and scanners.

In a preferred embodiment, each of the records in database tables 26-34 is related to a color record in color library table 24. For example, a plurality of records exists in color library table 24 corresponding to a particular shade of blue. The other criteria table 26 includes a plurality of substrates. The color library table preferably contains a plurality of color ink formulas that correspond to the particular shade of blue and the plurality of substrates contained in other criteria 26. Furthermore, printing techniques table contains the types of printing method, for example, offset and gravure printing. The other criteria table 26 also contains records that relate to the ability of that blue color to resist a plurality of elements, such as water, solvent, acid, alkali, temperature, humidity, abrasion, crocking, bending, light and ultraviolet radiation. By relating records in a plurality of tables to one or more records in the color library table 24, System 2 provides a robust system and method for providing selections directed to color product design and development.

Further, System 2 provides a plurality of selectable choices for users to retrieve a plurality of color ink formulas to transmit to one or more color ink specialists, for example, ink manufacturers.

A detailed description of the parties to System 2 and their respective functions is now discussed with reference to FIG. 4.

In accordance with the principles of the present invention, System 2 preferably receives color product data from a plurality of sources, including color measuring devices and user terminals 6. As noted above, System 2 preferably receives stores a plurality of color ink formulas to create a color, and further provides a way to select among colors, substrates and other criteria to retrieve a plurality of color ink formulas for transmission to color product development specialists.

The demand for color products and services originates from many types of businesses and non-business parties that have needs for color production. For example, consumer product manufacturing, advertising, promotional material, and interior and exterior design companies require color-related services. Color products customers 36 specify color requirements for packaging products, for example food packaging. Color products customers 36 further provide details including package design parameters, colors, substrates and print processes to one or more parties. System 2 allows the associated color product development specialists to communicate substantially simultaneously.

Many communications between the contributing parties to the development of a color product occur. For example, printers/converters 42 contract with ink manufacturers 44 for production of ink. Formulators 40 calculate appropriate color formulas that define appropriate color weights and combinations of pigment for creation of a specific color, for example by referencing data in color library table 24. Ink manufacturers 44 further communicate with raw material suppliers, dyers, separators, plate makers, cylindrical engravers and the like, for materials according to specific parameters. As noted above, the prior art method of communicating this information is costly and time consuming.

Other embodiments of the present invention are available with regard to the way a user interfaces with System 2. For example, once the designer 38 selects the desired color (e.g., navy blue), System 2 presents available substrates that can support the color. Moreover, after the designer 38 selects a substrate, System 2 presents available printing techniques that can produce the desired color product. In an alternative embodiment, System 2 provides many choices to the designer 38 at the outset of the color product design, and as the designer 38 makes selections (e.g. navy blue on a particular substrate).

Other material supply specifications include details such as color, rheological properties, product resistance, and residual chemical requirements. Completed ink samples are transmitted to a printer/converter 42 and are further delivered to several parties, including color products customer 36, designer 38 and/or formulator 40 for approval.

In an example embodiment of the present invention, site processor 4 functions as a gate keeper of sorts and monitors at least one content in transmissions between the parties. For example, designer 38 may select a color ink formula in accordance with the present invention, and converter 42 may determine, for example for some business reason, that the color ink formula selected by the designer 38 is inappropriate. Converter 42 may substitute one or more variables in the color ink formula, and proceed with converting the colored print. In the example, designer 38 may not be aware that the converter has made a modification to the color ink formula, and may not be satisfied with the final result of the colored print. Alternatively, converter 42 may transmit a message to designer 38 that some variable of the color ink formula is to be substituted based on the converters 42 business determination. In this alternative example, the flow of production may be interrupted as designer 38 reviews the changes to the color ink formula made by converter 42.

Figure 4:
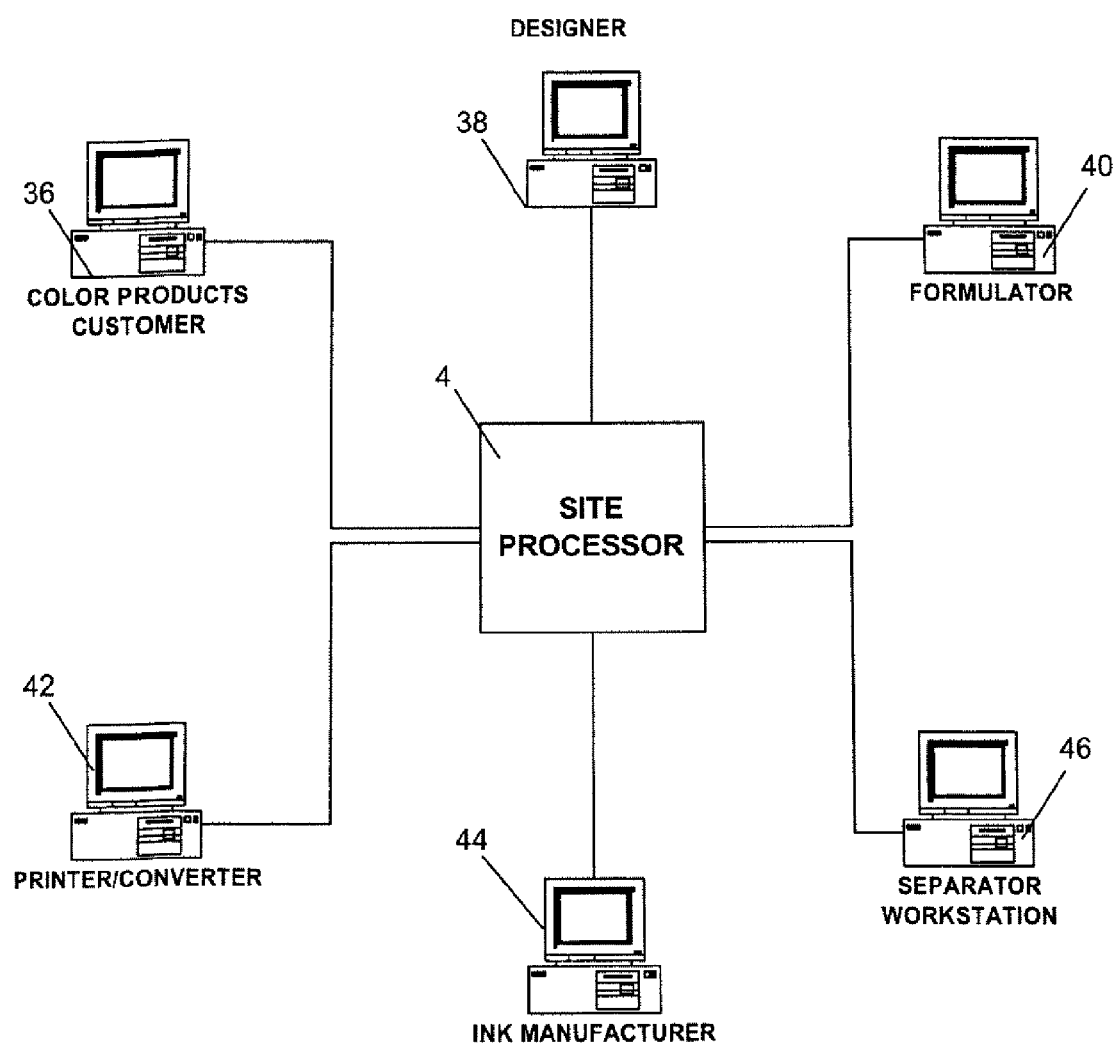
FIG. 4 depicts the relationships between the pertinent parties.

In accordance with an example embodiment of the present invention, site processor 4 recognizes when a transmission between the respective parties of FIG. 4 may be problematic. Preferably, site processor 4 notifies the parties of potential inconsistencies of inabilities to produce the colored print of colored product prior production. For example, site processor 4 maintains a database that represents details with respect to materials that are supported by the parties. For example, site processor 4 preferably maintains information that converter 42 does not have access to a color ink. When designer 38 transmits a color ink formula that converter 42 cannot support, site processor 4 preferably notifies designer 38 thereof. Thus, in accordance with an example embodiment of the present invention, site processor 4 functions as a gate keeper of sorts in order to prevent production from starting and stopping due to inconsistencies in the market.

An example of maintaining a database of color ink formulas is now described with reference to the flowchart shown in FIG. 5. This example represents one possible sequence of events.

Figure 5:
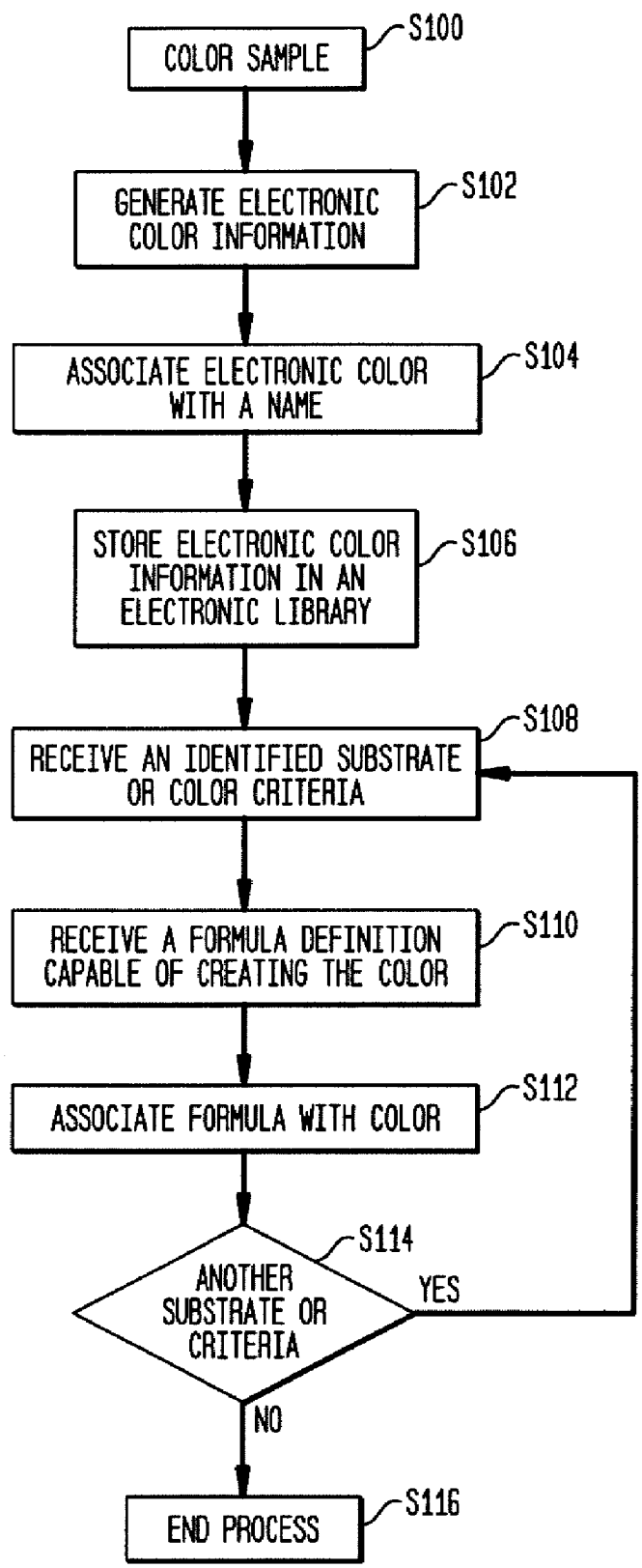
FIG. 5 shows a flow chart identifying a control of the processes involved in associating color ink formulas in a color library.

As shown in FIG. 5, a color sample is received (step S100). A color sample may be received by the present invention in different ways. For example, and as noted above, a visible spectrum of a color sample is read and data directed to measured amounts of light absorbed or reflected at particular points in a spectrum are generated. Alternatively, an electronic palette file is accessed on a user terminal 6 and edited to include a new color. For example, an ASCII text file is opened in a text editor and a new entry is provided that identifies respective RGB values to represent the new color. Thereafter, the text file is saved and the electronic palette, when accessed, uses the newly added RGB values to display the respective color.

In step S102, the electronic color information, for example, RGB values, CMYK values, spectral data or the like is generated. Thereafter, the electronic color information is associated with a name (steps S104). For example, the color, teal, is associated with numeric values that represent the respective RGB values that are used to represent the color on a computer display 22. Thereafter, the electronic color information and associated name are stored in an electronic color library, for example, on site processor 4 (step S106). The electronic color information is thereby made retrievable by displaying an electronic color palette that includes a visual representation and associated name of the newly added color, teal.

Prior to color ink formulas being made available, additional information is preferably provided to System 2. For example, in step S108, a substrate is identified and received. For example, a list of substrates is available for selecting a substrate for the color. For example, a graphic control, such a drop-down list, displays corrugated cardboard, aluminum and paper, and a user makes a selection, for example, corrugated cardboard. In a preferred embodiment, additional criteria are available via the same or another graphic control that represents other criteria that may have an impact on the ink formula required to create the color. For example, rheological properties, product resistance and residual chemical requirements may be available via a drop-down list that may have an impact on the particular formula required to create the color. Moreover, a plurality of printing techniques may be available, via a graphic control, that a user selects from to identify a particular printing technique.

After the substrate or other criteria is received, then, in step S110, a color ink formula capable of creating the color either on the selected substrate, or corresponding with the criteria selected on step S108 is received by System 2. As noted above, the formula for an ink may be determined by manual mixing of colorants, followed by visual or instrumental confirmation of the color. Alternatively, the formula of an ink may be determined by using a CCM program. An ink formula may be retrieved from a palette of known good formulas for a respective color. The formula may be developed and entered manually by a master shader, or may be developed on a separate node in a network using a CCM program. Thereafter, the System 2 preferably associates the color ink formula with the respective color (step S112).

After the color ink formula is associated with a color, then System 2 preferably prompts the user for another substrate or criteria that is to be associated with the selected color (step S114). In the event that the user wishes to associate another substrate or other criteria with the respective color, then the process preferably loops to step S108 and another substrate or other criteria is provided. In the event that the user does not wish to associate another substrate or other criteria with the respective color, then the process terminates at step S116. Thereafter, users are able to retrieve the colors added in System 2, and further can identify specific substrates or other criteria to retrieve a color ink formula that matches the selections.

Figure 6:
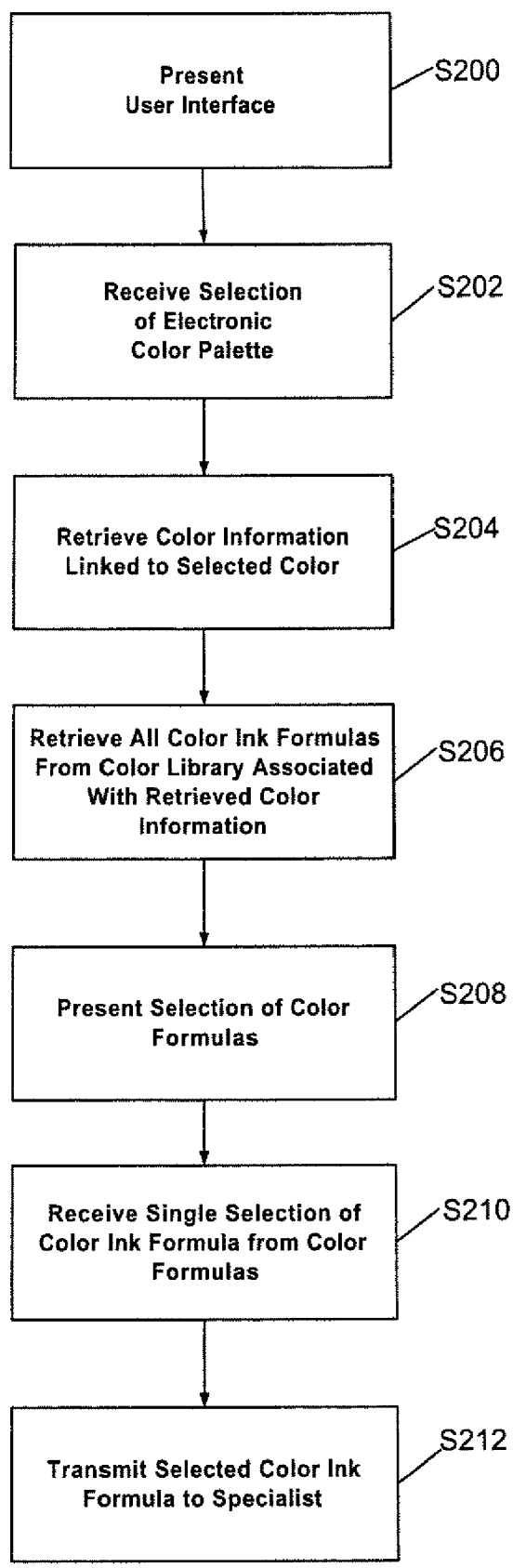
FIG. 6 depicts a flow chart identifying the control of processes involved in selecting one or more color ink formulas and transmitting the selected color ink formulas to a specialist.

FIG. 6 shows a flow chart associate with retrieving a specific color ink formula and transmitting that color to a color specialist, for example, a color ink manufacturer. Although the example flow chart in FIG. 6 is directed to color ink formulas, the steps are similarly applicable for retrieving a colorant formula.

As shown in the steps illustrated in FIG. 6, as user interface is presented to a user of System 2 that enables the user to identify a color for displaying ink formulas for producing the identified color (S200). In step S202, an electronic color palette is provided as part of the user interface (step S200) that displays a plurality of electronic color swatches that identify color selections that are available to the user. After the user identifies the color for production, a selection is made and System 2 retrieves color information that is linked to the selected color (step S204). Thereafter, the System 2 retrieves all color ink formulas that are stored in the electronic color library that are associated with the color information that is retrieved from step S204 (step S206).

After the color ink formulas associated with the selected color are retrieved, System 2 preferably presents a selection of the color ink formulas that correspond with the selected color for the user (step S208). Thereafter, a selection of one or more color ink formulas is preferably made by the user that represents desired color ink formula (s) associated with the selected color and corresponds with, for example, a specific substrate or other criteria that are previously identified (see the flowchart in FIG. 5) (step S210). In an alternative embodiment, all of the color ink formulas can be transmitted to another party, such as an ink manufacturer, who will then determine and use the appropriate formula(s) for creating the color. After the selection is made by the user in step S210, the System 10 preferably transmits the selected color ink formula to a specialist, such as an ink manufacturer (step S212).

Thus, using the steps described above with respect to FIG. 6, a user identifies a specific color from an electronic color library and is provided with a plurality of color ink formulas that are capable of defining an ink substrate suitable for creating the selected color.

Figure 7:
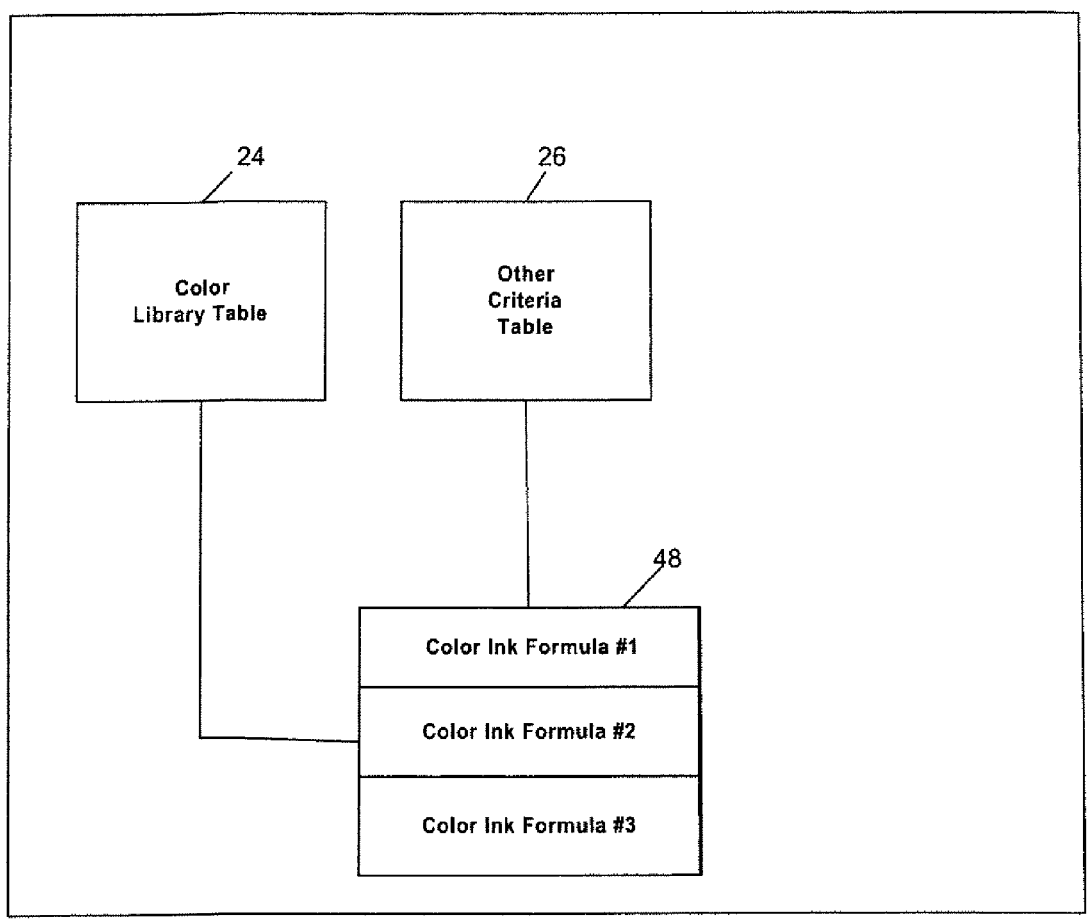
FIG. 7 illustrates the interaction of a color library table and other criteria table 26 to produce a plurality of color ink formulas.

FIG. 7 shows an illustration of the interaction between the color library table 24, the other criteria table 26 to provide a plurality of color ink formulas to a user operating System 2.

While the embodiment shown in FIG. 7 regards color ink formulas, the invention is not so limited. As noted above, the invention is applicable for providing colorant formulas as well. Continuing now with the example in FIG. 7, in order to create the color, teal, a plurality of formulas are provide, each formula corresponding with a particular substrate or other criteria. As shown in FIG. 7, color ink formulas table 48 shows color ink formulas 1, 2 and 3 that identify the particular color ink formulas for creating a selected color that correspond with the plurality of substrates and/or other criteria in the other criteria table 26, and that have been associated with the selected color in the color library table 24.

Figure 8:
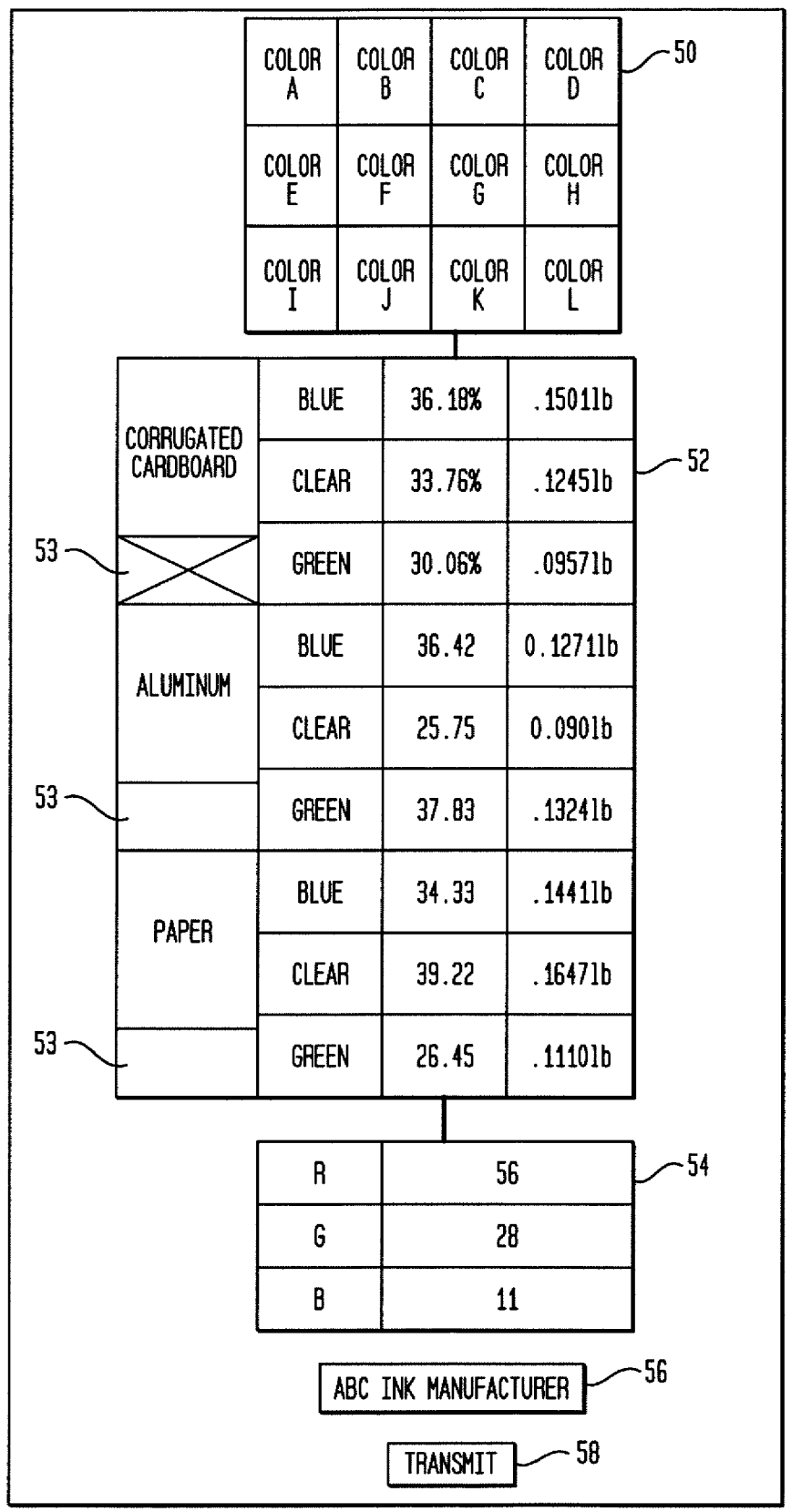
FIG. 8 illustrates the interrelationships between the color library table color samples, color pigments for creating ink, and the numeric representation in RGB format, for example, for a display.

FIG. 8 illustrates the interaction between the tables identified in FIG. 3 and shows a sample interface that is provided to a user of the present invention. Any values depicted in FIG. 8 are merely illustrative, and are not meant to represent actual values for creating an ink suitable for a given color.

As shown in FIG. 8, a color palette 50 displays a plurality of colors that are selectable by a user. In the example shown in FIG. 8, the user has selected a specific color (color I). By selecting color I, the user is presented with a plurality of color ink formulas in ink formula table 52 for creating that color. The values shown represent the percentages of pigment and actual weights of pigment required for producing the color. Moreover, three sets of values are provided for a substrate, corrugated cardboard, aluminum and paper. As shown in FIG. 8, the percentage values and weights of pigment vary depending upon the respective substrate. A user can select one or more color ink formulas for transmission to or more parties by selecting a graphic control, for example, checkbox 53. In the example shown in FIG. 8, the user has selected the substrate, Corrugated Cardboard, by clicking on the respective checkbox 53.

Further, color format table 54 identifies respective RGB values for producing the color on an RGB format. As shown in FIG. 8, a graphic control, for example, a text box 56, is provided for identifying a party to receive the color ink formulas electronically. For example, the user identifies the name of an ink manufacturer and provides the name in the text box 56. In the example shown in FIG. 8, the ink manufacturer, ABC Ink Manufacturer, has been identified. Of course, one skilled in the art will recognize that other graphic controls are available for providing information selections, for example list boxes, drop down lists, and other tools, and can be used to provide selections for receivers of the color ink formula (s). Preferably, more than one receiver can be identified by graphic control 56, and a plurality of names can be provided by the user in text box 56 to ensure a plurality of parties receive the color ink formulas for creating the color, in this example, color I. After the user is satisfied with the entries in the text box 56, the user selects a graphic control, for example, transmit button 58, to transmit the color ink formulas indicated as selected, for example, by checkbox 53, to the intended recipients.

In a preferred embodiment of the present invention, a plurality of e-mail addresses are stored for the parties depicted in FIG. 4, and the System 2 uses the stored addresses to transmit the color ink formula (s). For example, an e-mail address "address book" is available to selected names and corresponding e-mail addresses. Of course, one skilled in the art will appreciate that other techniques of notification are available. For example, an Internet web site can be maintained and the associated parties, for example those shown in FIG. 3, can view the web site and view the color ink formulas that are selected. In an alternative embodiment, when a user selects the transmit button 58, an electronic fax notification is automatically generated and sent to a desired recipient. In such case, a plurality of fax numbers are preferably stored by System 2.

Additional functionality provided by System 2 is now described by way of an additional example.

A designer 38 creates a computer-aided design (CAD) drawing of office space and selects standard color furnishings and carpeting. The desired color of paint is selected by designer 38 from electronic displays for matching or contrasting furnishings. Color can be selected from an electronic palette of available paint colors and added to the CAD drawing. The designer 38 may opt to create a new color by manually making adjustments in System 2.

Continuing with the foregoing example, a plurality of ink formulas are automatically provided to the designer 38 using an interface, for example, as shown in FIG. 8. The designer selects the color ink formula that corresponds with the substrate that the designer knows will be used for the particular furnishings, and, thereafter, transmits the color ink formula to a color ink manufacturer.

Essentially the same operational phases take place in System 2 whether the need is for a building interior, a garment, a retail consumer product or a piece of graphic art. There is an inter-change of production of pre-production samples and ink formulas between the manufacturers, formulators, designers and printers that are electronically transmitted for approval and acceptance.

The present invention goes beyond merely substituting spectral data for physical samples. Physical samples are characterized and stored in an electronic library to which all parties have access. A common basis for comparison and communication is provided without the need for the physical proofing and examination.

The services provided by System 2 are preferentially arranged as a web site from which the user selects choices and functions. Initially, a user accesses the web site provided by site processor 4 by entering a URL corresponding to the network address of the web site. Upon accessing the web site and providing appropriate security data (e.g., user name and password), the user is presented with options for executing many of the processes described above. The web site is preferably designed to provide users with display screens appropriate to their respective security clearance. For example, designers and color products customers will have access to a color library and design display software, and printers will have access to formula data.

The present invention advantageously provides a comprehensive network-based facility that allows a variety of participants in the production chain to communicate color product data and color ink formulas with each other using a simple web browser interface. A plurality of users receive the same communications firsthand and substantially instantaneously. Additionally, a virtually unlimited number of users can log in and enter, monitor or resolve the types of color-related issues discussed herein limited only by the capacities of communication network 8 and site processor 4.

Users of the system can enter their own requests independently and data communications are triggered automatically without the need of system-provider personnel intervention. The invention therefore allows manufacturers, designers and printers to operate at peak efficiency, producing a high commercial gain, high customer satisfaction and successful return on investment.

Although the present invention has been described in relation to particular embodiments thereof, many other variations and modifications and other uses will become apparent to those skilled in the art. It is preferred, therefore, that the present invention be limited not by the specific disclosure herein.

The invention claimed is:

1. A method for providing a selection of at least one color ink formula that is suitable to produce a color for a colored print, wherein producing the color is based on at least one criteria, the method comprising:
   (a) providing a plurality of colors and a plurality of criteria in a computer to a first user;
   (b) providing a plurality of color ink formulas in a computer to a second user, each of the plurality of color ink formulas capable of defining a color ink suitable for producing at least one color for at least one colored print and based on the at least one criteria;
   (c) making a color selection from the plurality of colors with the computer;
   (d) making a selection of at least one criteria from the plurality of criteria;
   (e) determining by the computer whether the selected color and the at least one selected criteria match;
   (f) notifying a user, if the selected color and the at least one selected criteria do not match; and
   (g) selecting at least one color ink formula that is suitable to produce the color.

2. The method of claim 1, further comprising:
   transmitting to a color product development specialist the at least one color ink formula by the computer.

3. The method of claim 2, wherein the color product development specialist is at least one of a manufacturer, separator, printer, designer and ink manufacturer.

4. The method of claim 1, wherein the criteria includes at least one of a substrate, financial cost, availability and pigment formulation.

5. The method of claim 1, wherein the criteria includes the ability for a color to resist at least one of sunlight, water, solvent, acid, alkali, temperature, humidity, abrasion, cracking, bending, light and ultraviolet radiation.

6. The method of claim 1, wherein the steps a-f occur over a communication network.

7. The method of claim 6, wherein the communication network is the Internet.

8. The method of claim 6, wherein the communication network is an intranet.

9. The method of claim 1, further comprising storing color information in an electronic color library, the color information representing the plurality of colors.

10. The method of claim 9, wherein the color information is formatted as at least one of spectral data, CIEXYZ, CIELAB, CIELUV, CIEUVW, color space, chromaticity coordinates xy, u"v" and uv, computer graphics triplets including RGB, CMYK, HLS, HIS, HSV and HVC, Munsell notation, Swedish Natural Color System notation, Color-Curve notation, RAL notation, Pantone color number, DIC color number, opal tone, DIN color notation, Color Marketing Group color name, and Color Association of the United States color name.

11. The method of claim 9, further comprising providing an assigned name for each color of the plurality of colors.

12. The method of claim 9, wherein the electronic color library resides on at least one site processor.

13. The method of claim 9, further comprising displaying an electronic palette of the plurality of colors represented by the color information stored in the electronic color library.

14. The method of claim 1, wherein the step of providing the plurality of colors comprises displaying an electronic palette.

15. A method for providing a selection of color ink formulas, the method comprising:
   (a) receiving electronic color information from a first user, the electronic color information representing a plurality of colors;
   (b) receiving electronic criteria information, the electronic criteria information representing a plurality of criteria having an impact on at least one of the plurality of colors;
   (c) receiving electronic color ink formula information from a second user, the electronic color ink formula information representing formulas for making color ink suitable for producing the plurality of colors and based on at least one of the plurality of criteria;
   (d) providing an electronic color selection, the electronic color selection representing a choice of one of the plurality of colors; and
   (e) determining electronically whether the selection of color ink formulas that is suitable to produce a color based on the electronic color selection and based on the at least one of the plurality of criteria, wherein the method is halted;
   (f) notifying a user, if the selected color and the at least one of the plurality of criteria do not match; and
   (g) selecting at least one color ink formula that is suitable to produce the color.

16. The method of claim 15, further comprising electronically transmitting to at least one color product development specialist an electronic color ink formula corresponding with the selection of electronic color ink formulas.

17. The method of claim 16, wherein the at least one color product development specialist is at least one of a manufacturer, separator, printer, designer and ink manufacturer.

18. The method of claim 15, wherein the criteria includes a substrate.

19. The method of claim 15, wherein the criteria includes the ability for a color to resist at least one of water, solvent, acid, alkali, temperature, humidity, abrasion, crocking, bending, light and ultraviolet radiation.

20. The method of claim 15, wherein the steps a-f occur over a communication network.

21. The method of claim 20, wherein the communication network is the Internet.

22. The method of claim 20, wherein the communication network is an intranet.

23. The method of claim 15, further comprising storing the electronic color information in an electronic color library.

24. The method of claim 23, wherein the electronic color information is formatted as at least one of spectral data, CIEXYZ, CIELAB, CIELUV, CIEVW, color space, chromaticity coordinates xy, u"v" and uv, computer graphics triplets including RGB, CMYK, HLS, HIS, HSV and HVC Munsell notation, Swedish Natural Color System notation, Color-Curve notation, RAL notation, Pantone color number, DIC color number, opal tone, DIN color notation, Color Marketing Group color name, and Color Association of the United States color name.

25. The method of claim 23, further comprising providing an assigned name for each color of the plurality of colors.

26. The method of claim 23, wherein the electronic color library resides on at least one site processor.

27. The method of claim 15, wherein the step of providing a color selection comprises providing an electronic color palette.

28. A method for selecting at least one color ink formula that is suitable to produce a color for a colored print, wherein producing the color is based on at least one of a plurality of criteria, the method comprising:
- (a) receiving a physical sample of the color from a first user;
- (b) generating electronic color information from the physical sample; the electronic color information representing the color;
- (c) providing the plurality of criteria;
- (d) providing at least one color ink formula to a second user, each of the at least one color ink formula capable of defining a color ink suitable for producing the color for the colored print and based on at least one of the plurality of criteria;
- (e) making an electronic selection of at least one criteria from the plurality of criteria;
- (f) determining by a computer whether the electronic color information matches with the selected criteria, wherein the method is halted;
- (g) notifying the user, if the selected color and the at least one selected criteria do not match; and
- (h) selecting at least one color ink formula that is suitable to produce the color.

29. The method claim 28, further comprising electronically transmitting to at least one color product development specialist an electronic color ink formula corresponding with the selection of electronic color ink formula.

30. The method of claim 28, wherein the criteria includes at least one of a substrate, availability, financial cost and pigment formulation.

31. The method of claim 28, wherein the criteria includes the ability for a color to resist at least one of water, solvent, acid, alkali, temperature, humidity, abrasion, cracking, bending, light and ultraviolet radiation.

32. An electronic system for providing a selection of a plurality of color ink formulas to produce a color for a colored print and based on at least one of a plurality of criteria, the system comprising:
- (a) a memory, the memory providing a plurality of colors and the plurality of criteria to a first user, the memory further providing a plurality of color ink formulas to a second user, each of the plurality of color ink formulas capable of defining a color ink suitable for producing at least one color for a colored print and based on at least one of the plurality of criteria;
- (b) a color selection module, the color selection module providing an interface to make an electronic color selection from the plurality of colors;
- (c) a criteria selection module, the criteria selection module providing an interface to make a selection of at least one criteria from the plurality of criteria; and
- (d) a matching module, the matching module determining whether the selected color and the at least one selected criteria match, wherein the system is halted; and
- (e) a notification module, the notification module notifying a user, if the selected color and the at least one selected criteria do not match; and
- (f) a selecting module, the selecting module to select at least one color ink formula that is suitable to produce the color.

33. The system of claim 32, further comprising a communication network.

34. The system of claim 33, wherein the communication network is the internet.

35. The system of claim 33, wherein the communication network is an intranet.

36. The system of claim 32, further comprising a color ink formula transmission module, the color ink formula transmission module, the color ink formula transmission module transmitting at least one of the plurality of color ink formulas to at least one color product development specialist.

37. The system of claim 32, wherein the electronic color information is formatted as at least one of spectral data, CIEXYZ, CIELAB, CIELUV, CIEUVW, color space, chromaticity coordinates xy, u"v" and uv, computer graphics triplets including RGB, CMYK, HLS, HIS, HSV and HVC MUNSELL NOTATION Swedish Natural Color System notation, ColorCurve notation, RAL notation, Pantone color number, DIC color number, opal tone, DIN, color notation, Color Marketing Group color name, and Color Association of the United States color name.

38. The system of claim 32, further comprising an electronic color display module that displays the electronic color information as a palette of colors.

39. A method for providing a selection of electronic color information that is suitable to produce a color for a colored product and based on at least one criteria, the method comprising:
- (a) providing a plurality of colors and a plurality of criteria in a computer to a first user;
- (b) providing the electronic color information in a computer to a second user, the electronic color information capable of defining an ink or a colorant suitable for producing at least one colored product, wherein the producing the colored product is based on the at least one criteria;
- (c) making an electronic color selection from the plurality of colors;
- (d) making an electronic selection of at least one criteria from the plurality of criteria;
- (e) electronically matching the selected color and the selected criteria;
- (f) notifying a user if the selected color and the at least one selected criteria do not match; and
- (g) selecting the electronic color information that is suitable to produce the color.

40. The method of claim 39, further comprising:
electronically transmitting to at least one color product development specialist a colorant formula corresponding with the electronic selection of the at least one colorant formula.

41. The method of claim 40, wherein the color product development specialist is at least one of a manufacturer, separator, printer, designer and colorant manufacturer.

42. The method of claim 39, wherein the criteria includes a substrate.

43. The method of claim 39, wherein the criteria includes the ability for a color to resist at least one of sunlight, water, solvent, acid, alkali, temperature, humidity, abrasion, cracking, bending, light and ultraviolet radiation.

44. The method of claim 39, wherein the criteria includes at least one of financial cost, availability and pigment formulation.

45. The method of claim 39, wherein the steps a-e occur over a communication network.

46. The method of claim 45, wherein the communication network is the Internet.

47. The method of claim 45, wherein the communication network is an intranet.

48. The method of claim 39, further comprising storing electronic color information in an electronic color library, the electronic color information representing the plurality of colors.

49. The method of claim 48, wherein the electronic color information is formatted as at least one of spectral data, CIEXYZ, CIELAB, CIELUV, CIEUVW, color space, chromaticity coordinates xy, x"v" and uv, computer graphics triplets including RGB, CMYK, HLS, HIS, HSV and HVC, Munsell notation, Swedish Natural Color System notation, ColorCurve notation, RAL notation, Pantone color number, DIC color number, opal tone, DIN color notation, Color Marketing Group color name, and Color Association of the United States color name.

50. The method of claim 48, further comprising providing an assigned name for each color of the plurality of colors.

51. The method of claim 48, wherein the electronic color library resides on at least one site processor.

52. The method of claim 48, further comprising displaying an electronic palette of the plurality of colors represented by the electronic color information stored in the electronic color library.

53. The method of claim 39, wherein the electronic colorant information comprises a color ink formula.

54. The method of claim 39, wherein the electronic colorant information comprises a colorant formula.

55. A method for providing a selection of electronic color information, the method comprising:
 (a) receiving color information in a computer from a first user, the color information representing a plurality of colors;
 (b) receiving criteria information, the criteria information representing a plurality of criteria having an impact on the at least one plurality of colors;
 (c) receiving color ink or colorant information in a computer from a second user, the color ink or colorant information representing at least one colorant suitable for producing the plurality of colors and based on at least one of the plurality criteria;
 (d) providing a color selection, the color selection representing a choice of one of the plurality of colors; and
 determining electronically whether the selection of color ink or colorant information that is suitable to produce a color and based on the color selection and based on the plurality of criteria;
 (f) notifying a user if the selected electronic colorant information and the at least one of the plurality of criteria do not match;
 (g) selecting at least one electronic colorant information that is suitable to produce the color.

56. The method of claim 55, further comprising electronically transmitting to at least one color product development specialist a colorant formula corresponding with the selection of colorant information.

57. The method of claim 56, wherein the at least one color product development specialist is at least one of a manufacturer, separator, printer, designer and ink manufacturer.

58. The method of claim 55, wherein the steps a-e occur over a communication network.

59. The method of claim 58, wherein the communication network is the Internet.

60. The method of claim 58, wherein the communication network is an intranet.

61. The method of claim 55, further comprising storing the color information in an electronic color library.

62. The method of claim 61, wherein the color information is formatted as at least one of spectral data, CIEXYZ, CIELAB, CIELUV, CIEVW, color space, chromaticity coordinates xy, u"v" and uv, computer graphics triplets including RGB, CMYK, HLS, HIS<HSV and HVC, Munsell notation, Swedish Natural Color System notation, ColorCurve notation, RAL notation, Pantone color number, DIC color number, opal tone, DIN color notation, Color Marketing Group color name, and Color Association of the United States color name.

63. The method of claim 61, wherein the electronic color library resides on at least one site processor.

64. The method of claim 55, further comprising providing an assigned name for each color of the plurality of colors.

65. The method of claim 55, further comprising displaying an electronic palette of the plurality of colors.

66. The method of claim 55, wherein the electronic colorant information comprises a color ink formula.

67. The method of claim 55, wherein the electronic colorant information comprises a colorant formula.

68. The method of claim 55, wherein the criteria includes a substrate.

69. The method of claim 55, wherein the criteria includes the ability for a color to resist at least one of water, solvent, acid, alkali, temperature, humidity, abrasion, crocking, bending, light and ultraviolet radiation.

* * * * *